United States Patent [19]
Rosauer et al.

[11] Patent Number: 5,528,691
[45] Date of Patent: Jun. 18, 1996

[54] METHOD FOR AUTOMATICALLY ASSIGNING ENCTYPTION INFORMATION TO A GROUP OF RADIOS

[75] Inventors: Matthew M. Rosauer, Chicago; Paul A. Arnone, Hanover Park, both of Ill.

[73] Assignee: Motorola, Inc., Schaumburg, Ill.

[21] Appl. No.: 317,270

[22] Filed: Oct. 4, 1994

[51] Int. Cl.[6] .................................................. H04L 9/08
[52] U.S. Cl. ............................................................ 380/21
[58] Field of Search ............................................... 380/21

[56] References Cited

U.S. PATENT DOCUMENTS

| | | | |
|---|---|---|---|
| 5,146,497 | 9/1992 | Bright | 380/21 |
| 5,150,408 | 9/1992 | Bright | 380/21 |
| 5,161,189 | 11/1992 | Bray et al. | 380/21 |
| 5,164,986 | 11/1992 | Bright | 380/21 |
| 5,185,795 | 2/1993 | Bright | 380/21 |
| 5,185,797 | 2/1993 | Barrett et al. | 380/21 |
| 5,301,232 | 4/1994 | Mulford | 380/21 |
| 5,404,403 | 4/1995 | Bright et al. | 380/21 |

OTHER PUBLICATIONS

Motorola Information sheet "Advanced SECURENET™"—Digital Voice Protection System Key Management Controller, (No. R3–17–62—1989).

Motorola Information Brochure "Advanced SECURENET™ Systems"—Multikey Operation, Over-the-Air Rekeying (OTAR), No. R3–17–61—1989).

Motorola Brochure "System Planner—Advanced SECURENET™ for Conventional Systems". (No. R4–17–1A—Jan., 1992), pp. 1–24.

Motorola System Installation and User's Guide for "Advanced SECURENET™—Key Management Controller (KMC)", (No. 68P81084E85–B, Apr. 10, 1992), Set Up Chapter, pp. 1–1 to 1–22.

Primary Examiner—Salvatore Cangialosi
Attorney, Agent, or Firm—Susan L. Lukasik

[57] ABSTRACT

This invention provides for a method for automatically assigning encryption keys to radios in a communication system. The radio users need only specify which radio units should be able to communicate with each other. The system takes care of automatically mapping traffic keys to subscribers in order to accomplish the desired radio groupings, thereby simplifying the process of assigning encryption information in a communication system.

16 Claims, 7 Drawing Sheets

METHOD FOR AUTOMATICALLY ASSIGNING ENCTYPTION INFORMATION TO A GROUP OF RADIOS

TECHNICAL FIELD

This invention relates in general to communication systems and more specifically to a method for automatically assigning encryption information to a group of radios.

BACKGROUND

Present day communication systems allow for reprogramming of radio encryption information (also known as "encryption keys" or "keys") using a central encryption station which transmits encryption information to remote radios which are part of the communication system using radio frequency (RF) signals. This over-the-air transmission of encryption information requires a computer data base to be kept in order to keep track of which encryption keys have been assigned to which radios in the system.

Although over-the-air (OTAR) encryption systems are well known in the art, some brief definitions of some common terms used in the art are given below:

traffic encryption key: A key used to encrypt and decrypt voice messages.

common shadow key: A key used to encrypt the traffic keys that a sent to subscribers.

talk group: A user-defined group of subscribers that need to be able to communicate. Subscribers in a talk group will have one traffic encryption key in common between all of the subscribers in the group.

rekey group: A group of subscribers that belong to the same combination of talk groups. The subscribers in a rekey group will have the same set of traffic keys and will also share a common shadow key. These groups are transparent to the user.

Figure 1:
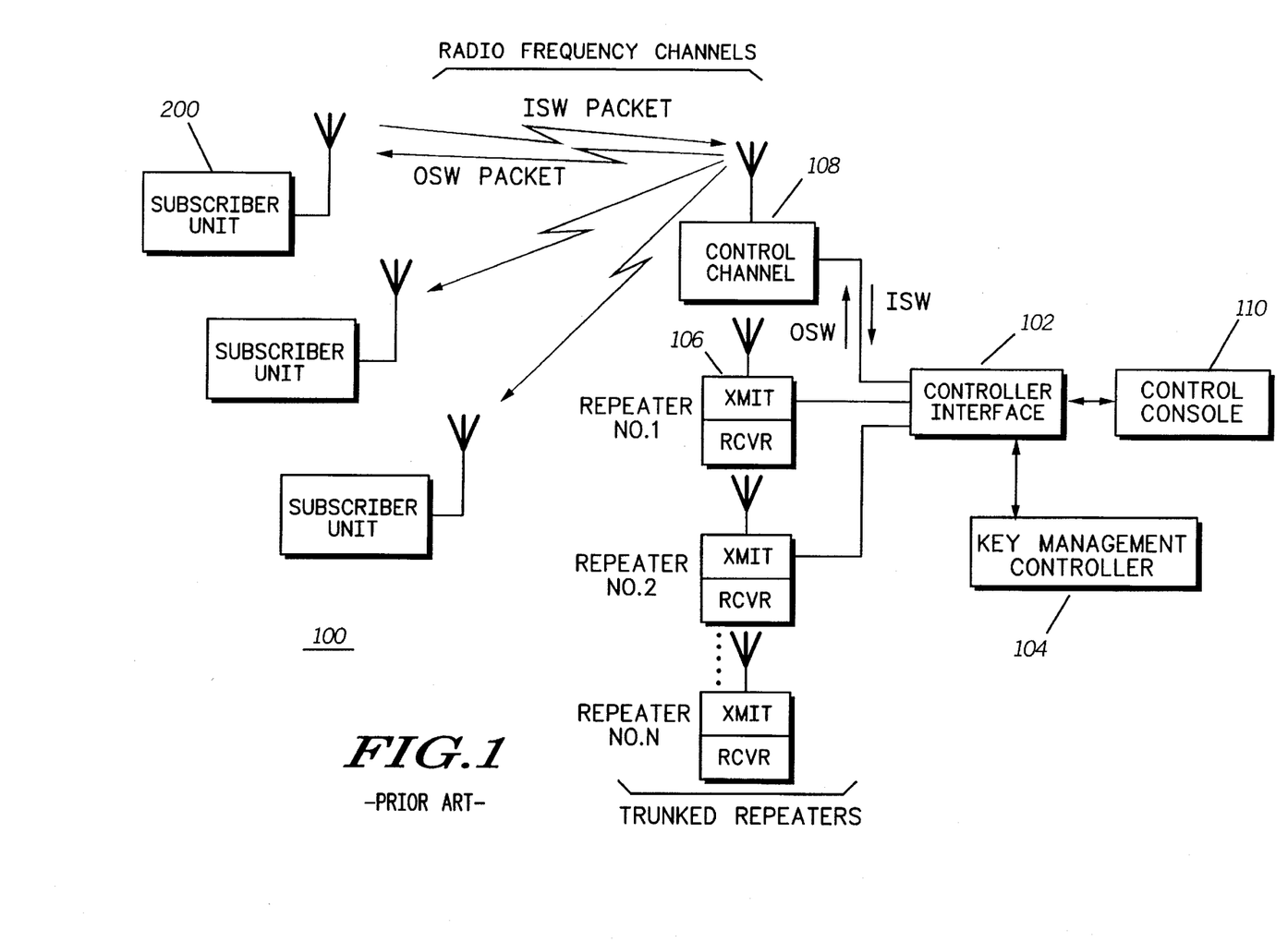
FIG. 1 is a block diagram of a prior art radio communication system in accordance with the invention.

Referring to FIG. 1, there is shown a block diagram of a prior art trunked radio communication system 100 in accordance with the invention. Radio communication system 100 includes a plurality of communication devices 200 such as two-way subscriber radios, mobile radios, fixed stations, etc. A controller interface 102 (such as a Digital Interface Unit manufactured by Motorola, Inc.) is included as part of the system and provides encryption functions and interface to a set of communication channel resource, such as repeater 106. The controller interface 102 also provides access between the communication channel resources 106 and the Key Management Controller (KMC) 104 and/or a manned control console such as a central controller 110 which may be utilized to coordinate the system's communication activity.

Control console 110 includes a speaker and other audio switching hardware for monitoring the received messages from repeaters 106 and a transmission means which includes a microphone and audio routing circuitry for transmitting messages to the communication devices 200. Control signals originating at control console 104 are transmitted via a dedicated control channel 108 to radios 200 which monitor the control channel for control information on a routine basis. Control console 110 is in charge of assigning voice/data repeaters 106 to groups of radios 200. Control console 110 also sends control signals to radios 200 which automatically direct groups of radios 200 to appropriate repeaters 106.

The controller interface 102 provides the encryption function for both voice/data and other types of information messages during both transmit and receive operations. Although FIG. 1 is shown as a trenched system, the present invention can also be used in cellular and other types of communication systems. Repeaters 106 which are connected to the controller interface 102 each comprise a transmitter and receiver section for use in communicating with communication devices 200.

Coupled to controller interface 102 is an encryption key management controller 104 such as a Key Management Controller (KMC) manufactured by Motorola, Inc. KMC 104 is a computerized system which includes a database means such as a computerized database of all system users, as well as encryption key information for all communication devices. KMC 104 also includes control software for determining which units have been rekeyed and which have not. KMC 104 decides when to poll each of the communication devices 200 in order to reprogram their encryption information after the system administrator decides to change the communication device's encryption keys. KMC 104 can be programmed to automatically update the communication device's encryption keys.

KMC 104 establishes communication with the communication units 200 via control channel 108 which is another repeater which allows the KMC bi-directional communication capability with the communication devices 200. Although shown as separate units, controller interface 102 and KMC 104 could be combined to form an integrated system controller. Furthermore, the KMC 104 and controller interface 102 may be utilized without the presence of a manned audio control console 108 in systems where audio is not required at the KMC location.

The KMC 104 also sets up mappings of encryption keys describing what keys should be loaded into which particular radios. These maps are then assigned to a rekey group and individual radios users are then assigned to the rekey groups. Presently, the procedure for assigning a group of radio subscribers their own traffic encryption key requires the steps of first, removing the subscribers from their current rekey groups. Next, a new rekey group is created for every rekey group that has a subscriber that will be in the new rekey group. A new map is then created with the appropriate traffic encryption keys for each new rekey group. Finally, the subscribers are added to their new rekey groups.

Figure 2:
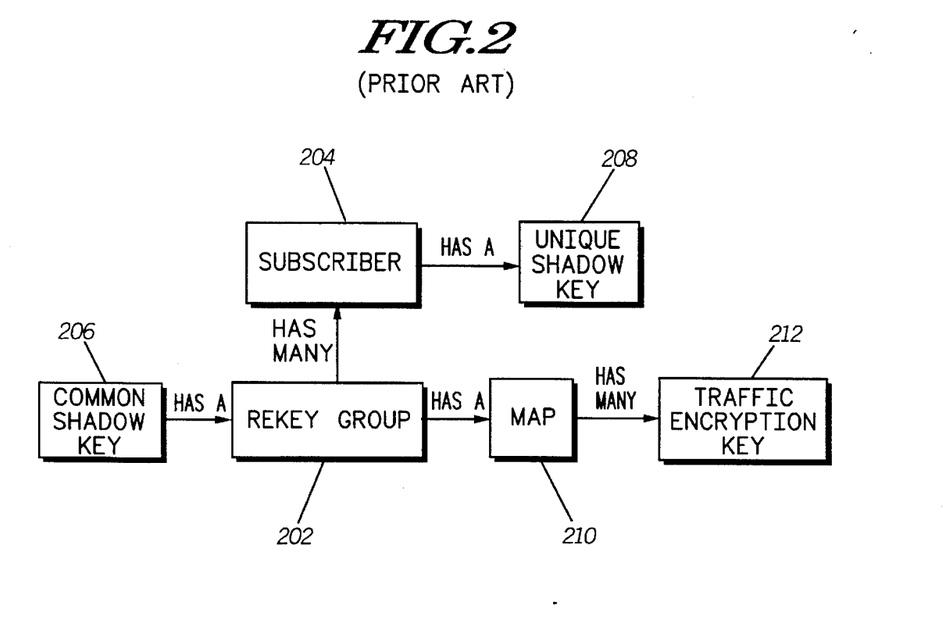
FIG. 2 is a block diagram of a prior art encryption key management controller configuration.

In FIG. 2, a block diagram of the functions performed by prior art KMC 104 are shown. In order to assign a group of radios their own traffic encryption key using this KMC configuration the radio users are first removed from their current rekey groups. Next, a new rekey group must be created for every rekey group that has a subscriber that will be in the new group. A new map must then be created with the appropriate traffic encryption keys for each new rekey group. Finally, the radio must be added to their new rekey groups.

In the prior art KMC, blocks 206 and 212 are the only functions which can be accomplished automatically by the KMC without the need for user involvement.

The problem with the above process is that keeping track of rekey groups and maps can become cumbersome as the communication system becomes larger (i.e., more radio subscribers are added to the system). Given this problem, their exists in the art a need for a method and apparatus for automatically mapping encryption information to radios.

DETAILED DESCRIPTION OF THE PREFERRED EMBODIMENT

While the specification concludes with claims defining the features of the invention that are regarded as novel, it is believed that the invention will be better understood from a consideration of the following description in conjunction with the drawing figures, in which like reference numerals are carried forward.

Figure 3:
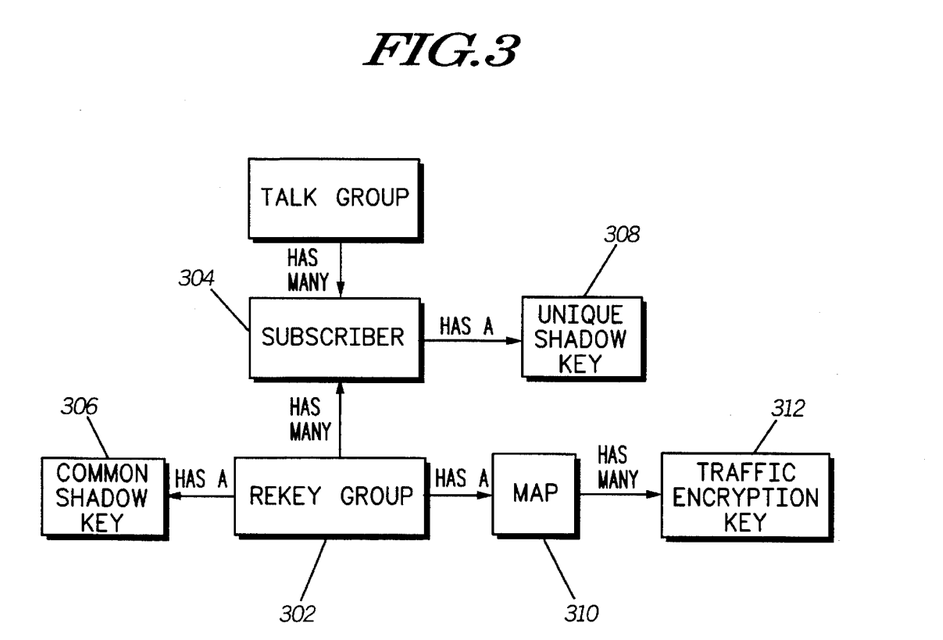
FIG. 3 is a block diagram of encryption key management controller with automatic key mapping in accordance with the invention.

Referring now to FIG. 3, a block diagram of a KMC configuration providing for automatic key mapping in accordance with the present invention is shown. In the present invention, the generation of new rekey groups and maps (blocks 302 and 310) is handled automatically by the system instead of the user as shown in FIG. 2, thereby greatly simplifying the work needed to change the subscriber groupings.

The purpose of the automatic encryption key mapping algorithm of the present invention is to automate the mapping or linking of traffic keys to subscriber radio units using a unique algorithm. The system user need only specify which units should be able to communicate with one another. The maintenance of the keys and the mapping of those keys to the correct subscribers is automated. As far as the user is concerned, there are no 'rekey groups'. All subscribers are placed into 'talk groups' where all subscribers in a particular talk group share a common traffic encryption key. System users only need to generate new talk groups and add subscribers to the talk groups. A particular subscriber may belong to multiple radio talk groups. In accordance with the invention, rekey groups are automatically generated and maintained based on the talk groups.

The operations that are allowed on the radio talk groups and the steps taken by the present invention in different system situations are discussed below.

Figure 4:
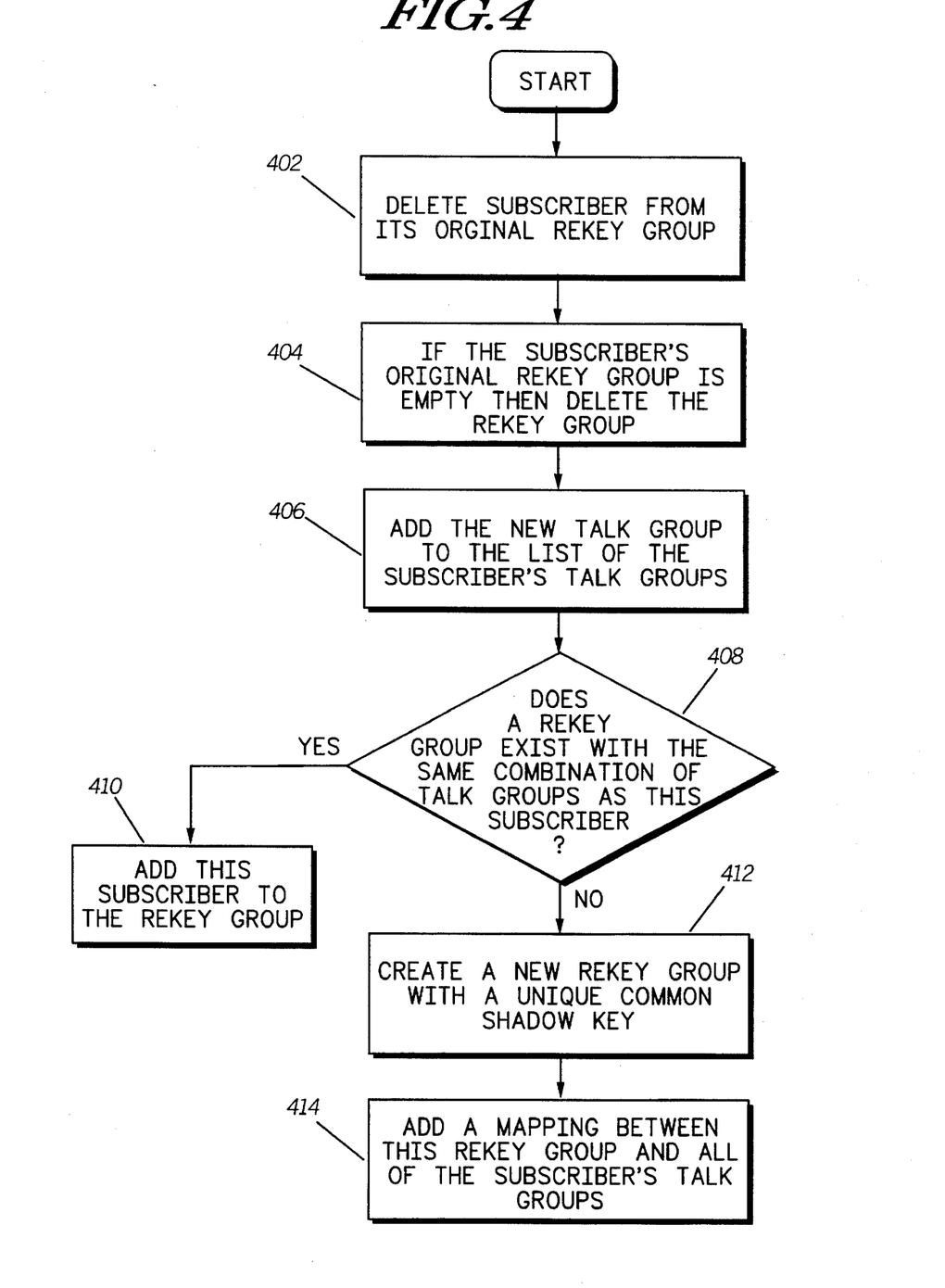
FIG. 4 shows a flowchart describing the steps for adding a radio unit to an existing radio talk group in accordance with the invention.

Subscriber radio unit is added to an existing talk group:

In order to add a radio unit to an existing radio talk group, the subscriber unit is first deleted from its original rekey group as shown in step 402, in FIG. 4. If it is determined in step 404 that the subscriber's original rekey group is empty (no radios assigned to that particular rekey group), then the rekey group is deleted in step 404. Next, in step 406, the new radio talk group is added to the list of the subscriber's talk groups. If a rekey group exists with the same combination of talk groups as this subscriber in decision block 408, the present invention adds the subscriber to the rekey group in step 410, otherwise, a new rekey group with a unique common shadow key is created in step 412. Finally, a mapping between the rekey group and all of the subscriber's talk groups is added in step 414.

Figure 5:
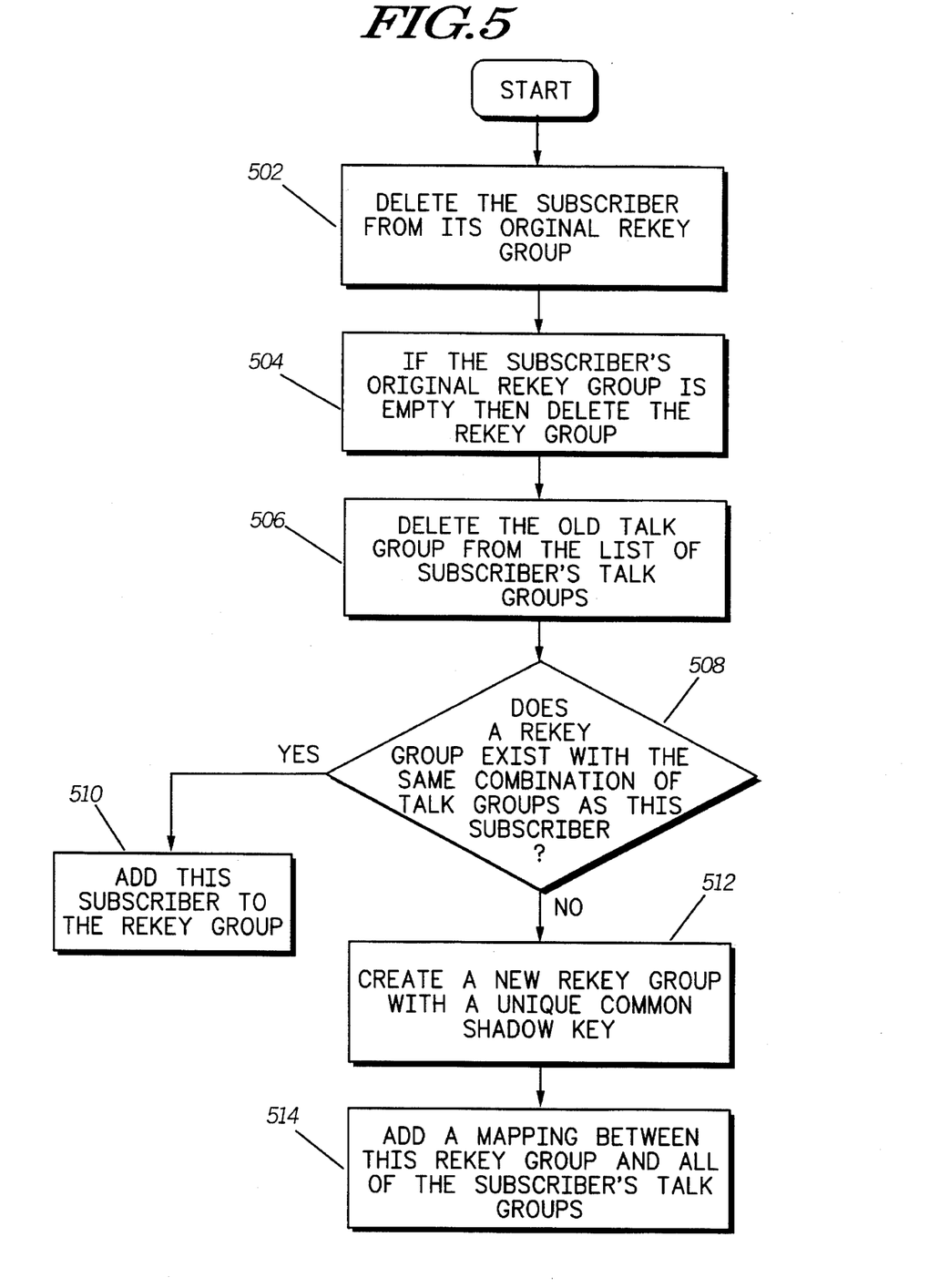
FIG. 5 shows a flowchart describing the steps for deleting a radio from an existing radio talk group in accordance with the invention.

Subscriber radio is deleted from an existing talk group:

A subscriber radio may only be deleted from a talk group if it belongs to at least one other talk group since every subscriber radio in the communication system must belong to a least one radio talk group. In FIG. 5, the steps required to delete a subscriber unit from an existing talk group are shown. In step 502, the subscriber radio is deleted from its original rekey group. Next, in step 504, it is determined if the subscriber's original rekey group is empty, and if empty, that rekey group is deleted. In step 506, the old radio talk group is deleted from the list of the subscriber's talk groups. If a rekey group exists with the same combination of talk groups as this subscriber in step 508, the subscriber radio is added to the rekey group in step 510.

If in step 508, a rekey group does not exist with the same combination of talk groups as the subscriber unit in step 512, a new rekey group with a unique common shadow key is created. Finally, in step 514, an automatic mapping (linking) between this rekey group and all of the subscriber's talk groups is done.

Figure 6:
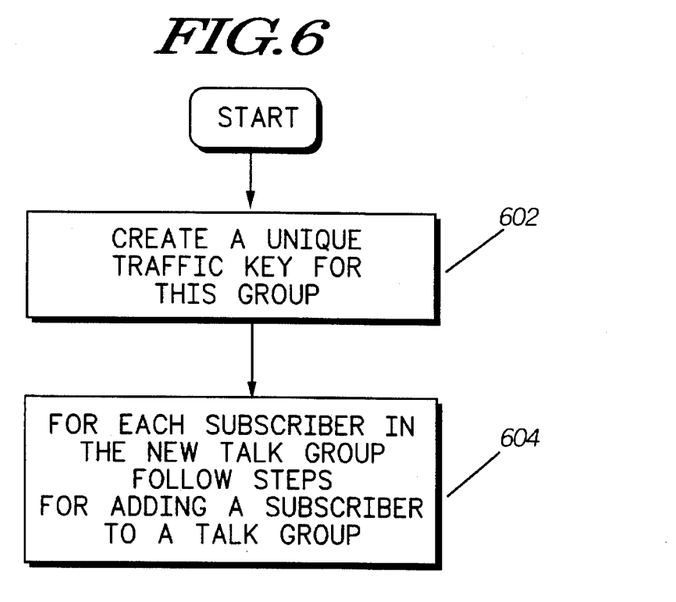
FIG. 6 shows a flowchart describing the steps for adding a radio talk group to the communication system in accordance with the present invention.

A radio talk group is added:

In FIG. 6, the steps needed to add a new radio talk group to the communication system in accordance with the preferred embodiment of the invention are shown. The first step, as outlined in step 602, is to create a unique traffic key for the new radio talk group. Once this is accomplished, the routine outlined in FIG. 4 is followed in step 604 for each subscriber that is to be in the new radio talk group.

Figure 7:
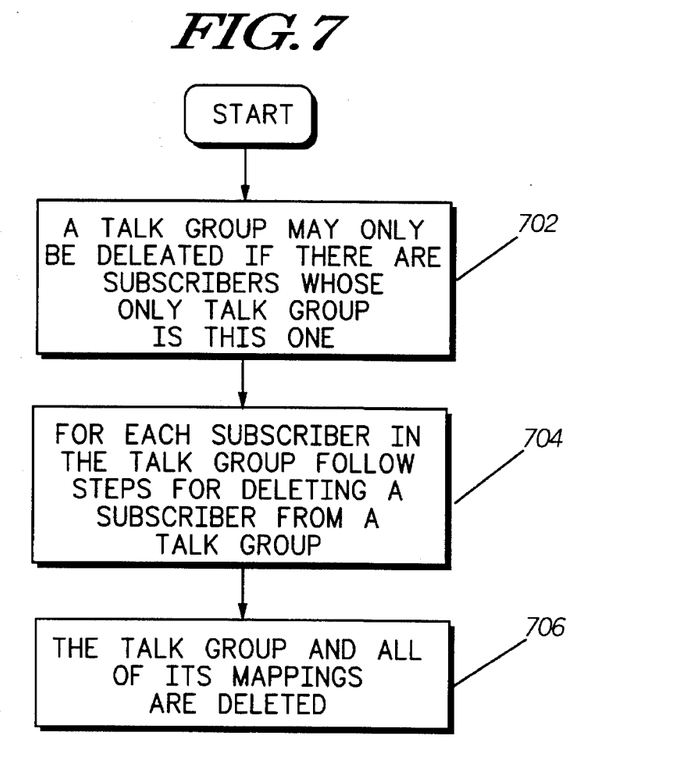
FIG. 7 shows a flowchart describing the steps for deleting a radio talk group from a communication system in accordance with the present invention.

A radio talk group is deleted:

Referring to FIG. 7, the steps required to delete a radio talk group in accordance with the present invention are shown. Please note that a radio talk group may only be deleted if there are no subscribers whose only talk group is the talk group which is being deleted, since every subscriber radio in the communication system must belong to at least one radio talk group. In step 702, it is determined if the above condition is met. In step 704, for each subscriber radio in the talk group to be deleted, the steps outlined in the flowchart of FIG. 5 is followed for deleting a subscriber from a talk group. Finally, in step 706, the talk group and all of its corresponding mappings are deleted.

Figure 8:
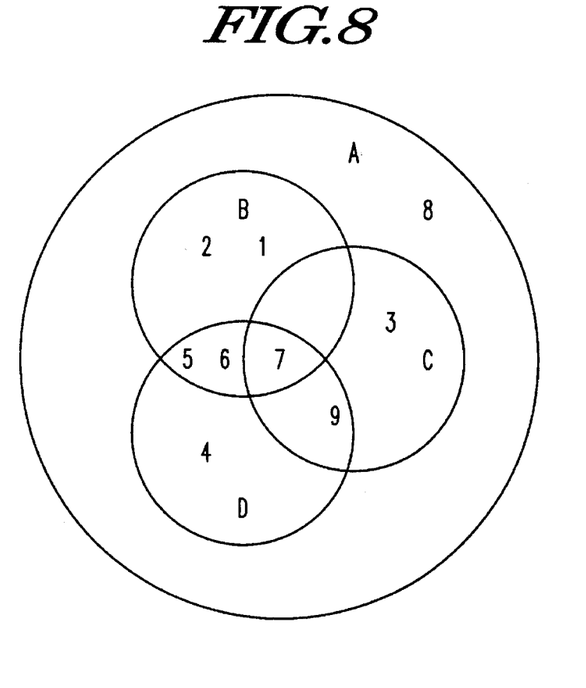
FIG. 8 shows an example of a set of radio talk groups.
Figure 9:
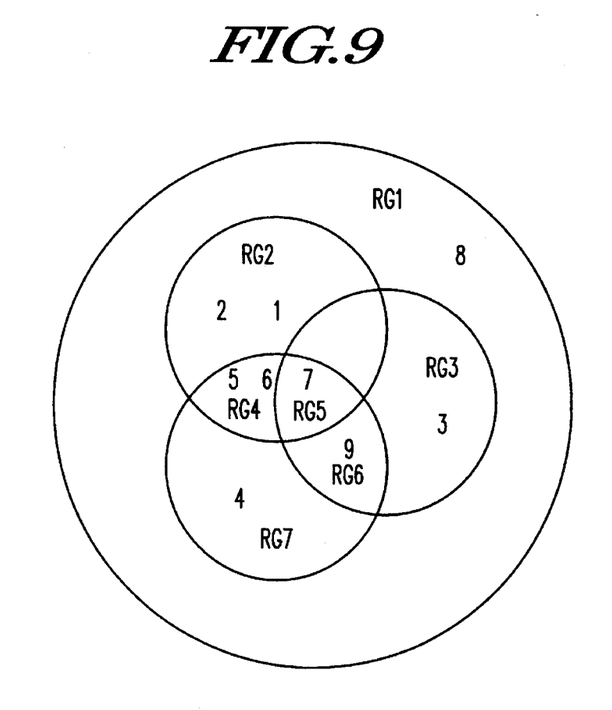
FIG. 9 shows an example of a set of rekey groups.
Figure 10:
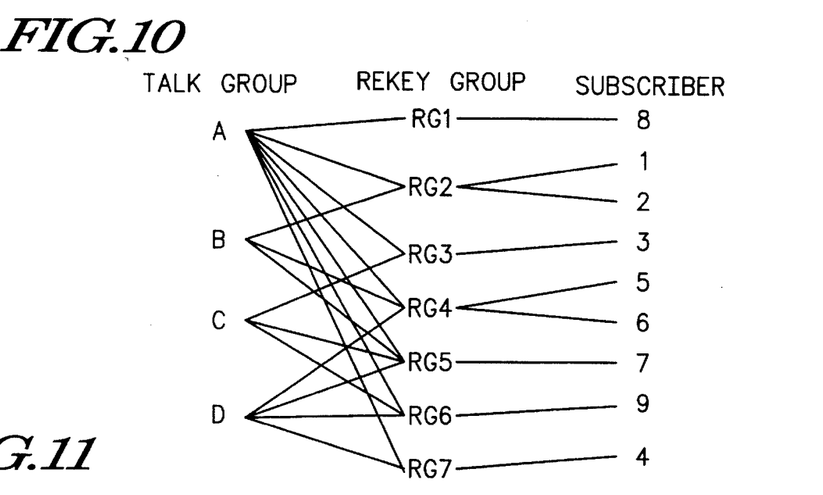
FIG. 10 shows how the radio talk groups of FIG. 8 are mapped to the rekey groups of FIG. 9 and then to the individual radios.

Illustrative examples:

In order to better illustrate the above mentioned features, a few illustrative examples will now be discussed with reference to FIGS. 8–10. FIG. 8 shows a set of radio talk groups designated as radio groups "A", "B", "C" and "D" are shown. Eight radios (1–8) are assigned to the four radio talk groups as shown. In FIG. 9, the same radio subscribers (1–8) are shown with their corresponding rekey groups. In FIG. 10, the radio talk group to rekey group and rekey group to individual radio subscriber mappings in accordance with the preferred embodiment of the invention are shown.

Illustrative example 1:

In accordance with the invention in order to add subscriber radio number 4 to radio talk group "B" the following steps are taken:

Step 1. First, subscriber radio number 4 is deleted from rekey group "RG7";

Step 2. Since RG7 is now empty, the entire rekey group RG7 is deleted;

Step 3. Next, radio talk group B is added to the list of talk groups for subscriber radio 4;

Step 4. Subscriber 4 now has A, B, and D as its talk groups;

Step 5. Compare the talk group combination of subscriber radio 4 with the current rekey groups.

Step 6. Subscriber 4 now has the same combination of talk groups as rekey group "RG4", so subscriber 4 is added to rekey group RG4.

Illustrative example 2

In order to delete subscriber radio 7 from talk group "D" the following steps are taken:

Step 1. Subscriber radio 7 is deleted from rekey group RG5;

Step 2. Radio talk group "D" is removed from the list of radio talk groups for subscriber 7. Subscriber radio 7 now has A, B, and C, as its radio talk groups;

Step 3. Next, the radio talk group combination of subscriber 7 with the current rekey groups are compared;

Step 4. Since no rekey group exists for the combination of talk groups A, B, and C, a new rekey group RG8 is generated, with a unique common shadow key; and Step 5. Finally, subscriber 7 is added to rekey group RG8.

Figure 11:
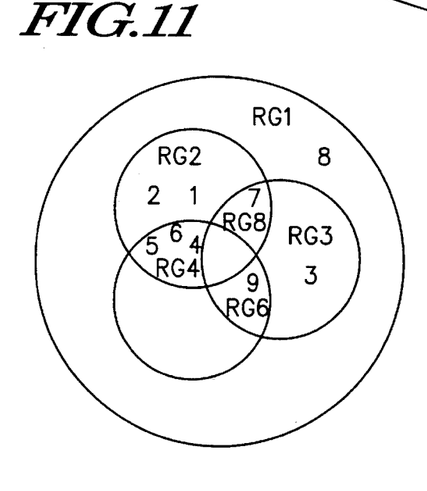
FIG. 11 shows the condition of the rekey groups after the illustrative examples have occurred.
Figure 12:
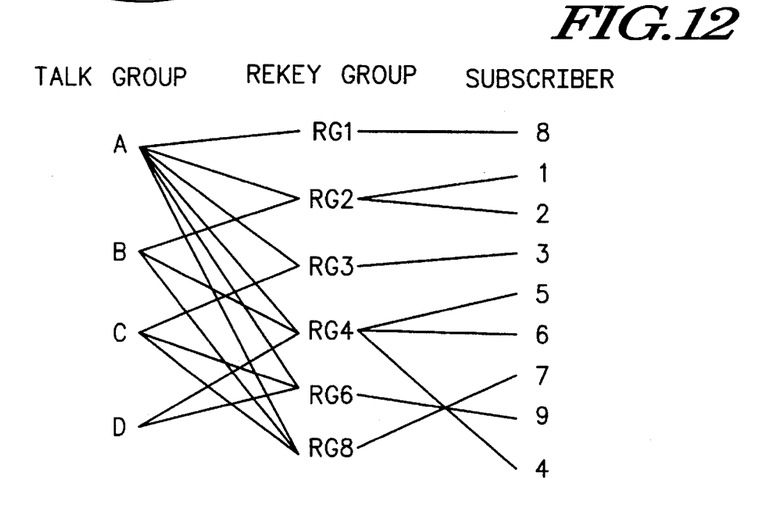
FIG. 12 shows the mapping of radio talk groups to rekey groups to individual subscriber units after performing the illustrative examples in accordance with the present invention.

Referring to FIGS. 11 and 12, the radio talk group to rekey group and rekey group to radio subscriber mappings are shown in accordance with the preferred embodiment of the invention after illustrative examples 1 and 2 above were performed.

Adding and deleting talk groups are an extension of the steps discussed above, with the additional step of a creating traffic encryption key when a talk group is created (as discussed with reference to FIGS. 6 and 7). While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

In summary, automatic key mapping in accordance with the present invention greatly simplifies the process of assigning encryption keys to individual radios in a communication system. By automatically mapping traffic encryption keys to radio subscribers the time required to fully define an encrypted system is shortened, thereby simplifying the task for communication system users.

What is claimed is:

1. A method for adding a radio to a radio talk group in a radio communication system which has a plurality of radios assigned to radio talk groups and encryption rekey groups, comprising the steps of:

(a) removing said radio from its assigned encryption rekey group;

(b) assigning the radio to said radio talk group;

(c) determining if an encryption rekey group exists in the radio communication system which has the same combination of radio talk groups as said radio has assigned to it; and (d) adding said radio to the encryption rekey group if one is determined to exist in step (c).

2. A method as defined in claim 1, wherein if no encryption rekey group is determined to exist in step (c) the following further steps are performed:

(e) generating a new encryption rekey group; and (f) automatically linking the new encryption rekey group generated in step (e) with all the radio talk groups assigned to said radio.

3. A method as defined in claim 2, wherein the new encryption rekey group generated in step (e) has a unique common shadow key.

4. A method as defined in claim 1, wherein if after step (a) is performed the encryption rekey group that was previously assigned to said radio has no other radios from among the plurality assigned to it, the encryption rekey group is deleted.

5. In a radio communication system which has a plurality of radios assigned to radio talk groups and encryption rekey groups, a method for removing one of said radios from one of its assigned radio talk groups, comprising the steps of:

(a) removing said one radio from its assigned encryption rekey group;

(b) removing the one radio talk group from the one radio's radio talk group assignment list;

(c) determining if an encryption rekey group exists in the radio communication system which has the same combination of radio talk groups as the one assigned to said one radio; and (d) adding said one radio to the encryption rekey group if one is determined to exist in step (c).

6. A method as defined in claim 5, wherein if no encryption rekey group is determined to exist in step (c) the following further steps are performed:

(e) generating a new encryption rekey group; and (f) automatically linking the new encryption rekey group generated in step (e) with all the radio talk groups assigned to said one radio.

7. A method as defined in claim 6, wherein the new encryption rekey group generated in step (e) has a unique common shadow key.

8. A method as defined in claim 5, wherein if after step (a) is performed, the encryption rekey group that was previously assigned to said one radio does not have other radios from among the plurality assigned to it, the encryption rekey group is deleted.

9. A method as defined in claim 5, wherein steps (a) through (d) are not performed if it is determined that the radio talk group to be deleted is the only radio talk group assigned to said one radio.

10. A method for adding a radio talk group in a radio communication system which has a plurality of radios assigned to radio talk groups and encryption rekey groups, comprising the steps of:

(a) generating a unique traffic encryption key for said radio talk group that is to be added; and (b) for each radio that is to be added to said radio talk group perform the following steps:

(c) removing said radio from its assigned encryption rekey group;

(d) assigning the radio to said radio talk group;

(e) determining if an encryption rekey group exists in the radio communication system which has the same combination of radio talk groups as said radio has assigned to it; and (f) adding said radio to the encryption rekey group if one is determined to exist in step (e).

11. A method as defined in claim 10, wherein if no encryption rekey group is determined to exist in step (e) the following further steps are performed:

(g) generating a new encryption rekey group; and (h) automatically linking the new encryption rekey group generated in step (g) with all the radio talk groups assigned to said radio.

12. A method as defined in claim 10, wherein the new encryption rekey group generated in step (g) has a unique common shadow key.

13. A method for deleting a radio talk group in a radio communication system which has a plurality of radios assigned to radio talk groups and encryption rekey groups, comprising the steps of:

(a) determining all of the radios from among the plurality which are assigned to the radio talk group that is to be deleted; and (b) for each radio that is determined to be assigned to the radio talk group that is to be deleted perform the following steps:

(c) removing said one radio from its assigned encryption rekey group;

(d) removing the one radio talk group from the one radio's radio talk group assignment list;

(e) determining if an encryption rekey group exists in the radio communication system which has the same combination of radio talk groups as the one assigned to said one radio; and (f) adding said one radio to the encryption rekey group if one is determined to exist in step (e).

14. A method as defined in claim 13, wherein if no encryption rekey group is determined to exist in step (e) the following further steps are performed:

(g) generating a new encryption rekey group; and (h) automatically linking the new encryption rekey group generated in step (g) with all the radio talk groups assigned to said one radio.

15. A method as defined in claim 14, wherein the new encryption rekey group generated in step (g) has a unique common shadow key.

16. A method as defined in claim 13, wherein steps (a) through (f) are not performed if it is determined that the radio talk group to be deleted is the only radio talk group assigned to any of said plurality of radios in said radio communication system.

* * * * *

UNITED STATES PATENT AND TRADEMARK OFFICE
CERTIFICATE OF CORRECTION

PATENT NO. : 5,528,691

DATED : June 18, 1996

INVENTOR(S) : Matthew M. Rosauer, Paul A. Arnone

It is certified that error appears in the above-identified patent and that said Letters Patent is hereby corrected as shown below:   Item [54], In the title:  --ASSIGNING ENCTYPTION--  should be --ASSIGNING ENCRYPTION--

Signed and Sealed this

Tenth Day of September, 1996

Attest:

BRUCE LEHMAN

*Attesting Officer*    Commissioner of Patents and Trademarks